United States Patent [19]

Page et al.

[11] 4,200,919
[45] Apr. 29, 1980

[54] APPARATUS FOR EXPANDING THE MEMORY OF A MINI-COMPUTER SYSTEM

[75] Inventors: Robert E. Page; Raymond B. Brackett, both of San Diego, Calif.

[73] Assignee: The United States of America as represented by the Secretary of the Navy, Washington, D.C.

[21] Appl. No.: 966,717

[22] Filed: Dec. 5, 1978

[51] Int. Cl.² .......................................... G11C 13/00
[52] U.S. Cl. ................................. 365/230; 365/189; 365/200
[58] Field of Search .............. 365/189, 49, 230, 231, 365/200

[56] References Cited
U.S. PATENT DOCUMENTS 3,680,061  7/1972  Arbab ................................. 365/189

Primary Examiner—Terrell W. Fears
Attorney, Agent, or Firm—Richard S. Sciascia; Ervin F. Johnston; James O. Skarsten

[57] ABSTRACT

Apparatus for storing information to be used by a data processing system which employs a mini computer, where the mini computer is incapable of addressing more than a specified maximum number of discrete storage locations. The apparatus includes a plurality of memory modules for providing a number of information storage locations which exceeds the specified maximum number of the mini computer, each memory module including a plurality of memory sections, each memory section for providing a number of information storage locations which does not exceed the specified maximum number. The apparatus further includes a component for generating memory select signals, each of the memory select signals corresponding to a different one of the memory sections. An additional component, which is responsive to the memory select signals, is provided for coupling the data and address buses of the mini computer to a given one of the memory sections when the memory select signal corresponding to the given memory section has been generated, whereby the mini computer is capable of selectively accessing any one of the memory sections.

10 Claims, 2 Drawing Figures

APPARATUS FOR EXPANDING THE MEMORY OF A MINI-COMPUTER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to memory expansion apparatus for a data processing system which employs a mini computer having the capability to address no more than a maximum amount of stored information, even though useful system operation requires that the mini computer be able to access a much greater amount of information. More particularly, the invention pertains to apparatus for use in a system which processes data in real time, wherein it is important to avoid time delay, while at the same time effectively expanding information storage capacity beyond the amount which can be addressed by a mini computer employed by the system.

In various types of digital data processing systems it has been found that mini computers may be employed to achieve substantial reductions in cost and space. For example, a system to be deployed aboard ships of the United States Navy, where cost and space limitations may be critical, advantageously includes a V-76 Varian mini computer. This system is being provided to allow classification of certain types of targets by detecting and receiving pertinent information from target environment, it being necessary to process received information in real time.

However, a drawback in the use of a mini computer is that, due to its internal or inherent structure, the mini computer may be incapable of addressing all of the information storage locations included in a very large memory. At the same time, use of the large memory may be necessary to provide all of the information storage capacity which is required by a system employing the mini computer. For example, the above Navy system requires a memory having the capacity to store 128K digital words of 16-bit length. At the same time, the Varian V-76 mini computer has the capability to address no more than a 32K 16-bit memory, or memory having 32K discrete storage cells or locations.

In the past, to expand the memory available to a mini computer, beyond its addressing capability, devices known as memory maps have been used. However, such memory maps may cost on the order of $3000-$5000 and may require substantial power, such as five volts at 17 amperes current. Also, the use of a memory map in a mini computer system usually causes a substantial complication of the software to be used by the system.

In addition to the above disadvantages, a memory map used with a mini computer system for memory expansion causes the operation of the system to be delayed by 200-300 nanoseconds each time the system executes a memory cycle, that is, reads data out of or writes data into a memory storage location. The delay results from the structure of the memory map which requires that, for each request for data from the memory, an address from the mini computer must be processed through a number of decoding steps to provide a physical address or hardware address, to which the memory will respond. Consequently, if the system executes a very long program, system operation may be delayed on the order of minutes or hours. In the above Navy system, in which it is critical to maintain system operation in real time, that is, to process data as soon as it is detected and received, delays of such magnitude may not be tolerated.

SUMMARY OF THE INVENTION

The present invention provides apparatus for storing information to be used by a data processing system which employs a mini computer having an address bus and a data bus, the mini computer being incapable of addressing more than a specified maximum number of discrete storage locations. The apparatus includes memory module means for providing a number of information storage locations which exceeds the specified maximum number, the memory modules means comprising a plurality of memory sections, each of the memory sections for providing a number of information storage locations which does not exceed the specified maximum number. The apparatus further includes means for generating memory select signals, each of the memory select signals corresponding to a different one of the memory sections, and accessing means responsive to each of the memory select signals, the accessing means for coupling the data bus and the address bus of the mini computer to a given one of the memory sections when the memory select signal corresponding to the given memory section has been generated. The present invention thereby provides apparatus for giving the mini computer the capability of selectively accessing any one of the memory sections.

Preferably, the mini computer in the above system is operated according to a specified program, and the signal generating means in the above apparatus comprises means for generating memory select signals in response to instructions included in the program. Consequently, the memory sections selected to be accessed by the mini computer, and the order in which they are selected, may be controlled by computer software. Preferably also, the accessing means comprises means for coupling the data bus and the address bus of the mini computer to a given one of the memory sections within a selected time period, not exceeding one memory cycle of the mini computer, from the time that the memory select signal corresponding to the given memory section is generated. If the given memory section comprises means for providing an array of volatile information storage locations which are to be successively accessed by the mini computer, very little delay will be encountered, since the time period of one memory cycle will be negligible compared with the time required to process all the data which may be stored by the array of storage locations. It will be readily apparent that the above apparatus is particularly well adapted for processing large data arrays in accordance with a small computer program.

In a preferred embodiment, the memory module means comprises a selected number of memory boards, each of the memory boards having a plurality of memory sections fixed thereto. The accessing means includes a programmable read-only memory coupled to each memory board, each of the programmable read-only memories being structured to provide an output which uniquely identifies each of the memory sections fixed to its memory board, in response to memory select signals.

OBJECTS OF THE INVENTION

An important object of the present invention is to expand the memory or information storage capacity of a data processing system, which employs a mini computer of limited address capability, without significantly reducing the speed of operation of the system.

Another object is to provide a comparatively simple and inexpensive apparatus for expanding the memory of a data processing system which employs a mini computer of limited address capability.

Another object is to substantially reduce the number of coding steps required in apparatus for expanding the memory of a data processing system which employs a mini computer, and also for substantially reducing the complexity of the software required for system operation.

Another object is to provide memory expansion apparatus which enables a mini computer to process data stored in a first memory section, which does not exceed the address capability of the mini computer, and then to access data stored in a second memory section of similar size, where the process of switching the mini computer from the first memory section to the second memory section does not require more than one or two memory cycles of the mini computer, the apparatus providing no delay while the mini computer is accessing either of the memory sections.

These and other objects of the invention will become more readily apparent from the ensuing specification when taken together with the drawings.

DESCRIPTION OF THE PREFERRED EMBODIMENT

Figure 1:
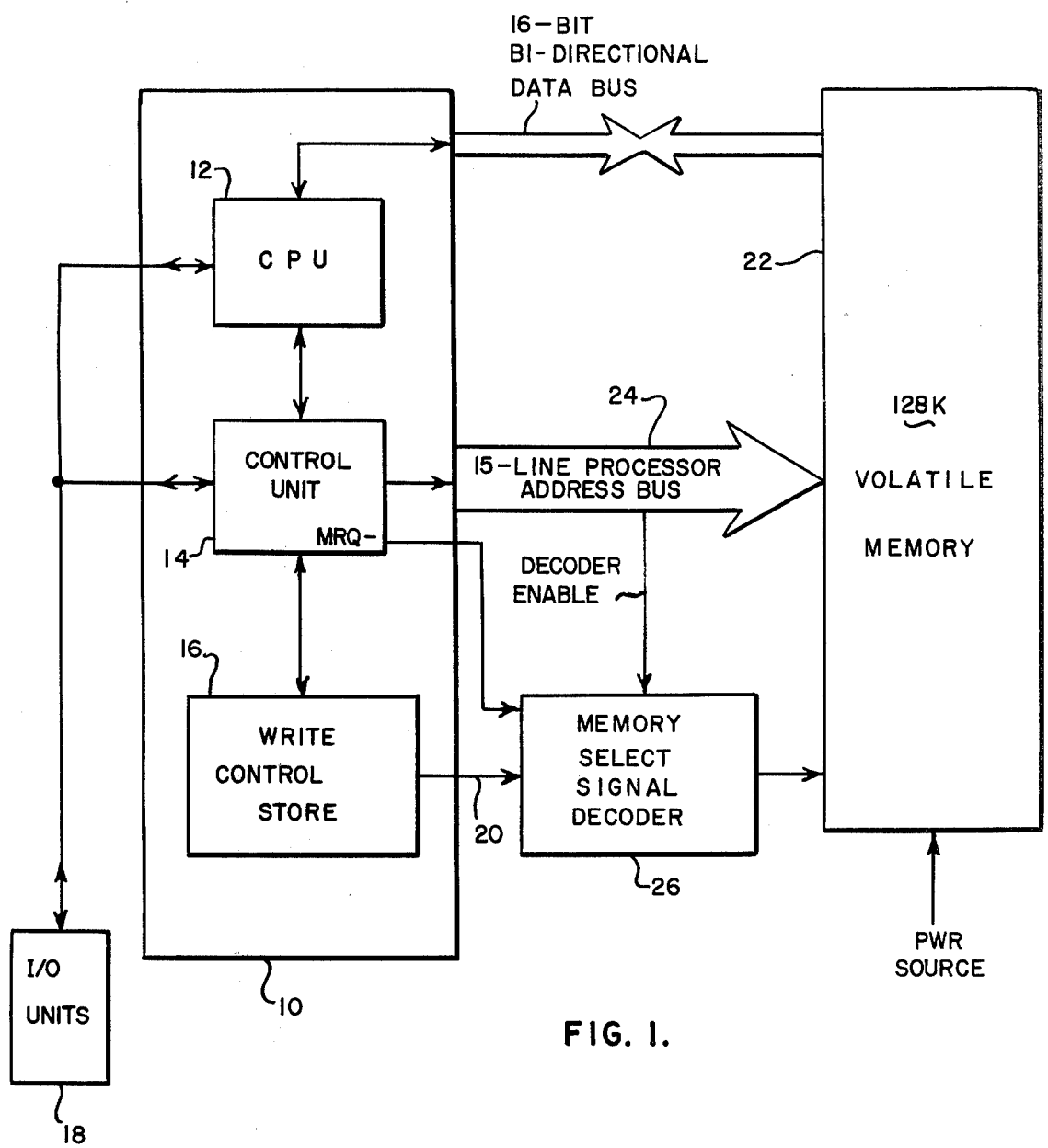
FIG. 1 is a block diagram showing a mini computer of limited address capability employed with memory expansion apparatus comprising an embodiment of the present invention.

Referring to FIG. 1, there is shown a mini computer 10 of conventional design, such as the Varian V-76, basic components thereof including a central processing unit 12, a control unit 14, and a writable control store 16. Mini computer 10 is operated according to a specified software or computer program, and is interconnected with selected input and output peripheral equipments, which are commonly referred to in FIG. 1 by reference numeral 18. Writable control store 16 operates in a conventional manner to provide selected outputs 20, which are determined by corresponding instructions included in the computer software.

Referring further to FIG. 1, there is shown a memory 22 which is provided with 128K discrete cells or locations for storing 16-bit digital words, memory 22 being of a volatile type. That is, when the power source activating memory 22 is switched off, all of the digital information stored therein is erased therefrom. A 16-bit bi-directional data bus is coupled between memory 22 and mini computer 10 so that digital information, comprising both data and instruction words, may be both read out of and written into memory 22 by mini computer 10 as mini computer 10 executes a specified program.

In order to address a memory which it is accessing, mini computer 10 is provided with a 15-line processor address bus 24. While FIG. 1 shows the address bus of mini computer 10 coupled to 128K memory 22, it will be readily apparent that the 15 lines of address bus 24 cannot provide more than 32K discrete addresses, or in other words, cannot enable mini computer 10 to access a memory having more than 32K discrete information storage locations. However, if mini computer 10 were to be provided with the capability to address a much greater memory, mini computer 10 would lose its advantages of comparatively low cost and small size.

Referring once more to FIG. 1, there is shown memory select signal decoder 26 receiving outputs 20 from writable control store 16. Decoder 26 also receives one of the address lines of processor address bus 24, a decoder enable signal being coupled therethrough from mini computer 10 to decoder 26. Decoder 26 provides an output which is coupled to memory 22 for purposes hereinafter described. A command signal MRQ— from control unit 14, for requesting data from the memory, is also coupled to decoder 26. The (—) in the data request signal MRQ— indicates that it is logic 0 in the system of FIG. 1.

Figure 2:
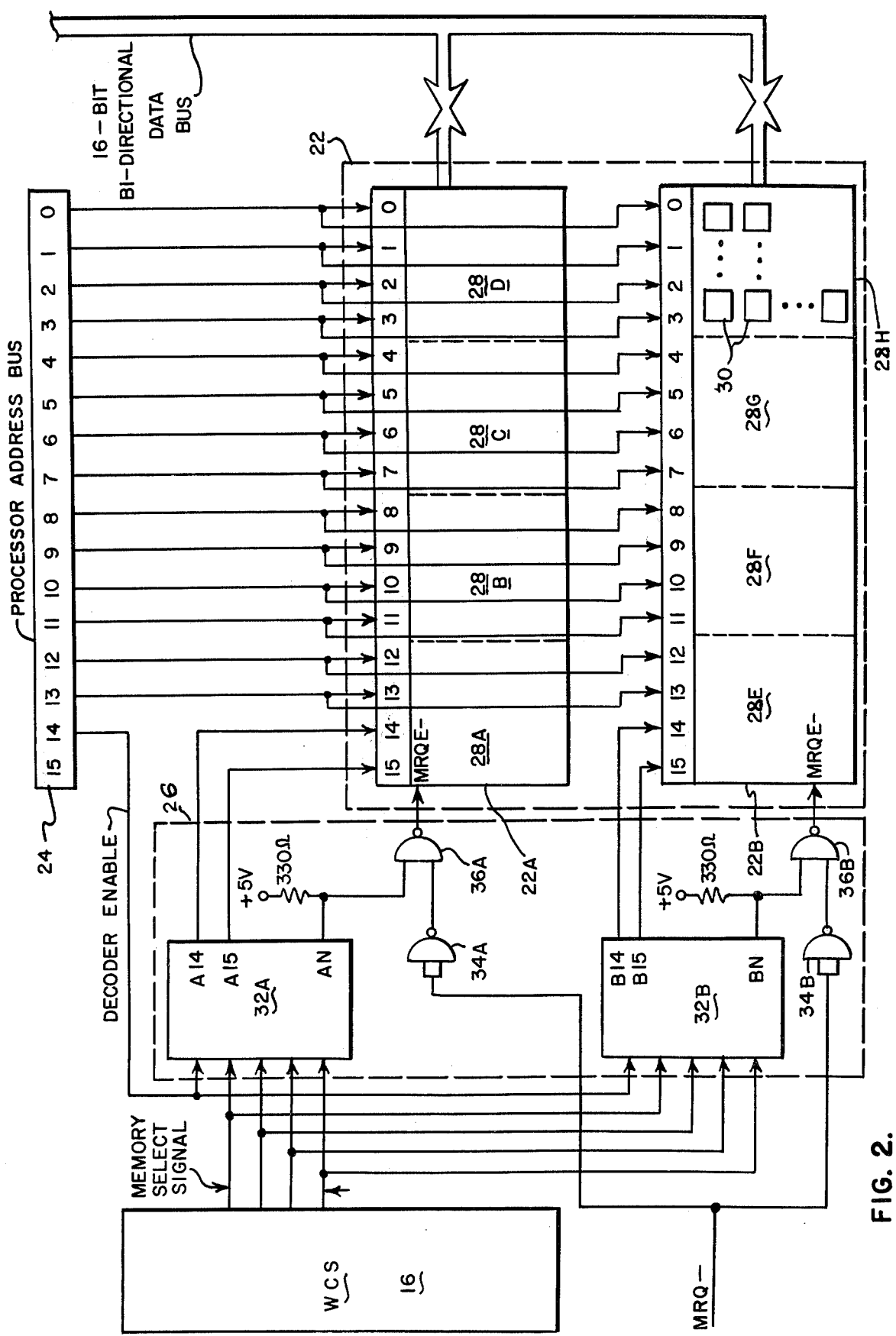
FIG. 2 is a block diagram showing the embodiment of FIG. 1 in greater detail.

Referring to FIG. 2, there is shown memory 22 comprising two memory modules, 22A and 22B. Each memory module may comprise a standard 64K planar memory board, such as a V70-660 manufactured by Varian (now Sperry Univac), and includes a memory address bus having address terminals numbered 0-15. The 16 address terminals of a memory board enables it to receive 64K addresses, whereby each of the 64K discrete information storage locations provided by a board may be accessed. Each memory board comprises four memory sections, memory board 22A being provided with memory sections 28A-28D, and memory board 22B being provided with memory sections 28E-28H. Each of the memory sections comprises an array of 16K discrete locations for storing digital words, such as the array of discrete storage locations 30, which comprise memory section 28H.

To access storage locations of one of the memory boards 22A or 22B, a logic 0 is coupled to the enabling terminal MRQE— of the memory board. Thereupon, a two-bit digital code or number is coupled to address terminals 14 and 15 of the memory board to select the memory section thereof which includes the storage locations, and to cause address terminals 0-13 of the memory board to be coupled to the selected section, through leads which are internal to the memory board. It will be noted that the two-bit code coupled to address terminals 14 and 15 of a memory board is sufficient to select one of the four 16K memory sections thereof, and that each storage location included in the selected memory section may be specified by a unique 14-bit address coupled to address lines 0-13 of the memory board.

Each of the storage locations of each of the memory boards is coupled through leads internal to the memory board to the bi-directional data bus of mini computer 10. Consequently, 16-bit digital information, comprising either data words or instruction words, may be selectively written into or read-out of each storage location of memory boards 22A and 22B.

Referring further to FIG. 2, there is shown decoder 26 including two selectively programmable read-only memories (PROMs) 32A and 32B. PROMs 32A and 32B may each comprise, for example, a 32×8 fusible link PROM, such as the type known commercially as the 74S188 PROM. Each PROM 32A and 32B has five inputs, whereby it may receive any of 32 different input words, and has three outputs, whereby it may provide any of eight different outputs.

FIG. 2 shows four of the inputs to each PROM to comprise a memory select signal, a four-bit code which is generated by writable control store 16 of mini computer 10. The four-bit memory select signal, which is generated in response to an instruction included in a program being executed by mini computer 10, is decoded by PROMs 32A and 32B to select one of the memory sections 28A-28H for access by mini computer 10. A fifth input to each of the PROMs is provided by terminal 14 of the processor address bus 24 of mini computer 10, and is coupled to each of the PROMs to enable them to decode a particular memory select signal. It will be noted that terminals 0-13 of the processor address bus remain available to provide a 14-bit address, which is sufficient to provide access to a 16K memory.

In order for mimi computer 10 to access the 16K memory provided by a given one of the memory sections 28A-28H, writable control store 16 generates a memory select signal which corresponds to the given memory section. Also, a memory request signal MRQ−, comprising a logic 0 as aforenoted, is provided by mini computer 10, and a logic 1 decoder enable signal is coupled from terminal 14 of processor address bus 24 to each of the PROMs 32A and 32B, enabling them to decode the memory select signal. The memory request signal is coupled to both inputs of NAND gates 34A and 34B, whereupon a logic 1 is coupled to one of the inputs of both NAND gates 36A and 36B.

If the memory section to be accessed is one of the sections 28A-28D, PROM 32A decodes the memory select signal, and couples a logic 1 out of its AN output terminal to a second input of NAND gate 36A, whereupon NAND gate 36A couples a logic 0 to the memory request enable terminal of memory board 22A. A two-bit digital code coupled from the A14 and A15 terminals of PROM 32A to address terminals 14 and 15 of memory board 22A specify the memory section thereof to be accessed. At the same time, PROM 32B responds to the memory select signal by coupling a logic 0 from its BN terminal to the second input of NAND gate 36B, so that NAND gate 36B generates a logic 1, disabling memory board 22B.

To access one of the memory sections 28E-28H, PROM 32A generates a logic 0 from its AN terminal to disable memory board 22A, and PROM 32B generates a logic 1 to enable memory board 22B. Terminals B14 and B15 couple a two-bit code to address terminals 14 and 15 of memory board 22B to select the memory section thereof to be accessed.

It will be noted that a 330 ohm pull up resistor is coupled between a five-volt source and the second inputs of the NAND gates 36A and 36B. The pull-up resistors are provided to ensure that NAND gates 36A and 36B clearly distinguish between 0 volt logic 0's and +5 volt logic 1's outputted by the PROMs to which they are respectively coupled, because PROMs 32A and 32B have open collectors.

The above switching procedure for coupling mini computer 10 to a given one of the memory sections may be accomplished within one memory cycle of mini computer 10, which is on the order of 600 nanoseconds. If the mini computer thereafter proceeds to access a large number of the storage locations of the accessed memory section, the delay in system operation resulting from accessing the memory section, i.e., a single memory cycle, will be negligible.

To change the memory being accessed by mini computer 10 from one of the memory sections 28A-28H to another, data processing operations will again be delayed by only one memory cycle. Since the mini computer will always be accessing a memory of 16K word capacity, which is well within the address capability of the mini computer, it will not perceive any change in the memory section which it is accessing, and data processing operations will in no way be affected, except that system operation will be delayed by the single memory cycle required to switch the mini computer from one memory section to another.

While the above embodiment employs two memory boards and two PROMs respectively coupled thereto to provide a 128K 16-bit memory, additional memory capacity may be provided by increasing the number of sets of 64K memory boards and PROMs, the memory board and the PROM of each set being interconnected with the several components of mini computer 10 in the same manner as is shown in FIG. 2.

Obviously, many other modifications and variations of the present invention are possible in the light of the above teachings, and, it is therefore understood that within the scope of the disclosed inventive concept, the invention may be practiced otherwise than as specifically described.

What is claimed is:

1. Apparatus for storing and accessing information to be used by a data processing system which employs a minicomputer having an address bus and a data bus, said minicomputer being capable of addressing a specific maximum number of discrete storage cells, said apparatus comprising:
   memory module means comprising a number of discrete information storage cells which exceeds said specified maximum number, said memory module means being divided into a plurality of memory sections, each of said memory sections comprising a selected number of said discrete information storage cells, the number of discrete storage cells in one of said memory sections not exceeding said specified maximum number;
   means included in said minicomputer for generating a plurality of memory select signals, each of said memory select signals uniquely corresponding to one of said memory sections; and
   accoring means responsive to each of said memory select signals for coupling the data bus and the address bus of said minicomputer to a given one of said memory sections when the memory select signal corresponding to said given memory section has been generated.

2. The apparatus of claim 1 wherein:
   said signal generating means comprises means for generating a specified one of said memory select signals when said minicomputer executes a preselected instruction included in the programming of said minicomputer; and
   said accessing means comprises means for coupling the data bus and the address bus of said minicomputer to a given one of said memory sections within a selected time period which has a length on the order of one memory cycle of said minicomputer, and which commences when the memory select signal corresponding to said given memory section is generated.

3. The apparatus of claim 2 wherein:
said accessing means comprises means for enabling said minicomputer to successively access a large number of discrete information storage cells of said given memory section at the conclusion of said time period.

4. The apparatus of claim 2 wherein said mini computer processes digital words of specified bit length and wherein:
said memory module means comprises a selected number of memory modules, each of said memory modules comprising a plurality of said memory sections, each of said memory sections comprising means for storing a number of digital words of said specified bit length which does not exceed said specified maximum number.

5. The apparatus of claim 4 wherein:
said accessing means includes a number of decoder elements equal to the number of said memory modules, each of said decoder elements being coupled to a different one of said memory modules, a memory select signal being simultaneously coupled to each of said decoder elements.

6. The apparatus of claim 5 wherein:
each of said memory modules comprises a planar memory board;
each of said memory sections comprises a section of one of said memory boards, the information storage cells of one of said memory sections comprising an array of storage locations for storing a number of digital words of said specified bit length, the number of storage locations in one of said arrays being equal to said specified maximum number; and
each of said decoder elements comprises a programmable read-only memory coupled to one of said memory boards.

7. The apparatus of claim 6 wherein:
a given one of said programmable read-only memories comprises means for decoding said memory select signals to provide outputs which uniquely specify each of the storage arrays of the memory board to which said given programmable read-only memory is coupled.

8. The apparatus of claim 6 wherein said accessing means further includes:
address lines coupled to each of said memory boards from the address bus of said minicomputer;
bi-directional means for conveying digital words of said specified bit length between each of said memory sections and the data bus of said minicomputer; and
an address line coupled to said decoder elements from the address bus of said minicomputer to enable said decoder elements to decode said memory select signal and to generate digital numbers, each of said digital numbers uniquely corresponding to one of said memory sections.

9. The apparatus of claim 8 wherein:
said decoding means further includes logic gate means, each of said logic gate means receiving a first input, which comprises a memory request from said mini computer, and also receiving a second input, which comprises an output of one of said decoder elements, each of said gate means for enabling the memory sections of one said memory modules to be accessed by said mini computer.

10. The apparatus of claim 9 wherein:
said means for generating said memory select signals comprises a writable control store included in said mini computer.

* * * * *

UNITED STATES PATENT AND TRADEMARK OFFICE
CERTIFICATE OF CORRECTION

PATENT NO. : 4,200,919

DATED : 29 April 1980

INVENTOR(S) : Robert E. Page and Raymond B. Brackett

It is certified that error appears in the above-identified patent and that said Letters Patent are hereby corrected as shown below:

Column 6, line 49, change "according" to -- accessing --.

Signed and Sealed this

Twelfth Day of August 1980

[SEAL]

*Attest:*

*Attesting Officer*

SIDNEY A. DIAMOND

*Commissioner of Patents and Trademarks*